United States Patent [19]

Usami

[11] Patent Number: 4,614,983

[45] Date of Patent: Sep. 30, 1986

[54] AUTOMATIC MUSIC PLAYING APPARATUS

[75] Inventor: Ryuuzi Usami, Tokyo, Japan

[73] Assignee: Casio Computer Co., Ltd., Tokyo, Japan

[21] Appl. No.: 524,848

[22] Filed: Aug. 19, 1983

[30] Foreign Application Priority Data

Aug. 25, 1982 [JP] Japan .................. 57-127410[U]
Sep. 10, 1982 [JP] Japan .................. 57-136531[U]
Dec. 24, 1982 [JP] Japan .................. 57-198940[U]

[51] Int. Cl.$^4$ .................. G10B 3/10; G10G 3/04; G11B 5/00
[52] U.S. Cl. .................. 360/4; 360/32; 360/72.2; 360/137; 369/14; 369/59; 369/63; 84/1.03; 84/1.01; 84/462; 84/DIG. 29
[58] Field of Search .................. 369/6, 14, 59, 63; 84/1.03, 1.28, 1.01, 462, DIG. 29; 360/4, 32, 55, 72.1, 72.2, 137

[56] References Cited

U.S. PATENT DOCUMENTS

| 4,022,097 | 5/1977 | Strangio | 84/DIG. 12 |
| 4,281,579 | 8/1981 | Bennett, Sr. | 84/478 |
| 4,338,644 | 7/1982 | Staar | 360/132 |
| 4,487,101 | 12/1984 | Ellen | 84/462 |

FOREIGN PATENT DOCUMENTS

| 3047506 | 7/1982 | Fed. Rep. of Germany . |
| 3309899 | 9/1983 | Fed. Rep. of Germany . |
| 1548789 | 7/1979 | United Kingdom . |
| 2032162 | 4/1980 | United Kingdom . |
| 2120441A | 11/1983 | United Kingdom . |

Primary Examiner—Robert L. Richardson
Attorney, Agent, or Firm—Frishauf, Holtz, Goodman & Woodward

[57] ABSTRACT

In an automatic music playing apparatus, musical data entered at a keyboard are temporarily stored in a RAM and are sequentially recorded on a magnetic tape. The RAM has a memory capacity larger than the longest musical data to be recorded on the magnetic tape and has memory areas which are all accessed by a CPU. The musical data is then recorded in a predetermined data area on the magnetic tape.

3 Claims, 28 Drawing Figures

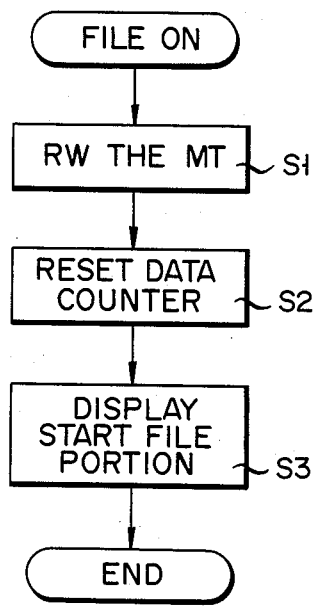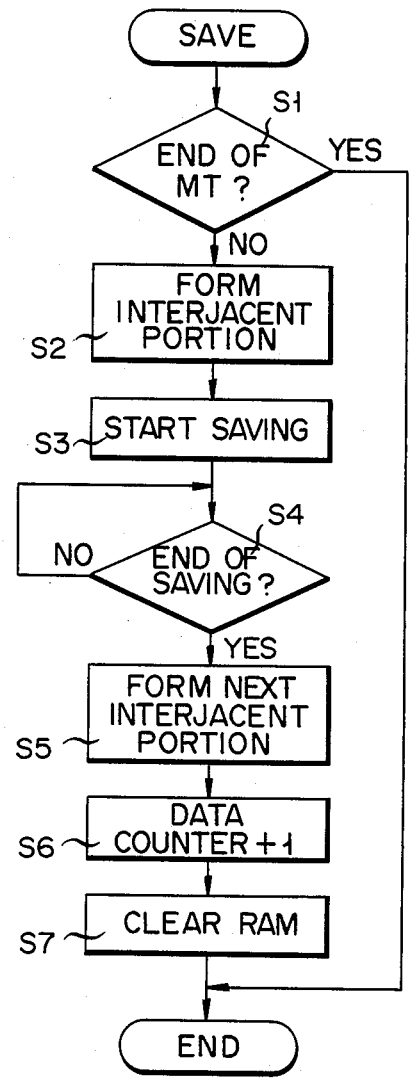

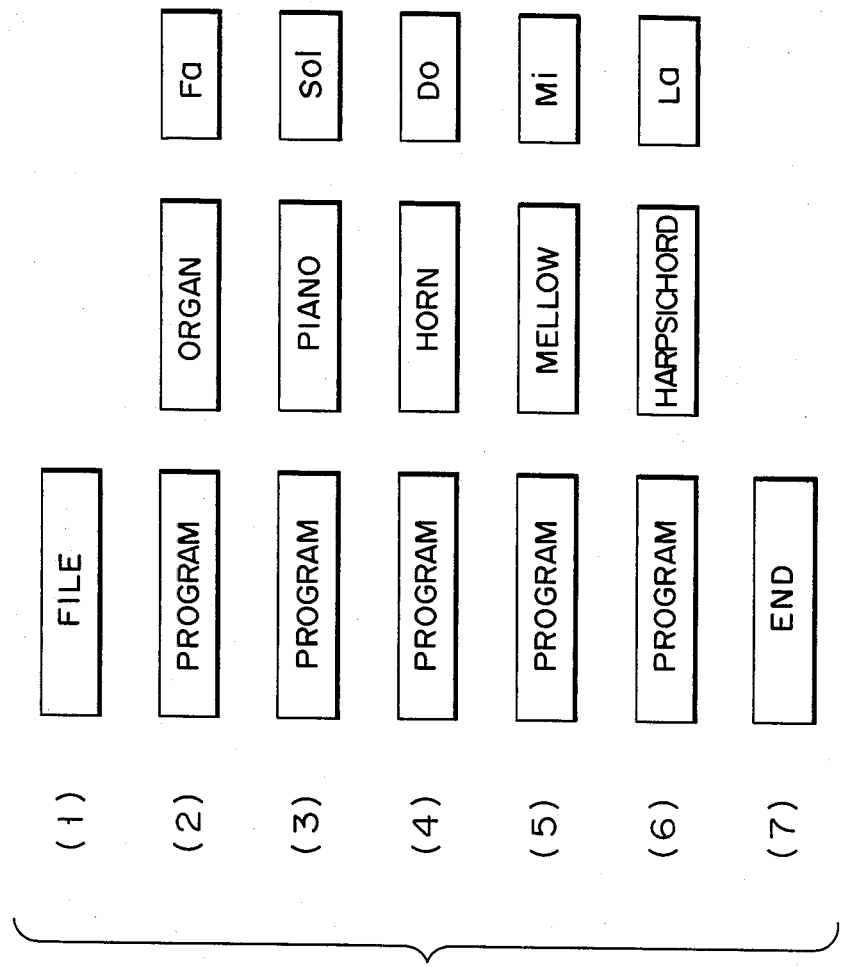

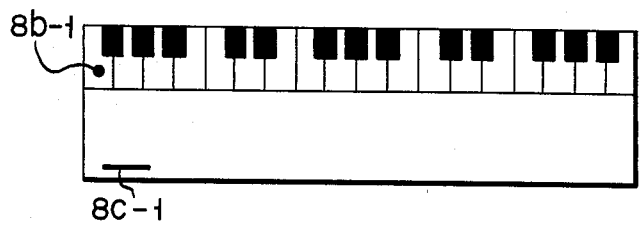
F I G. 16A
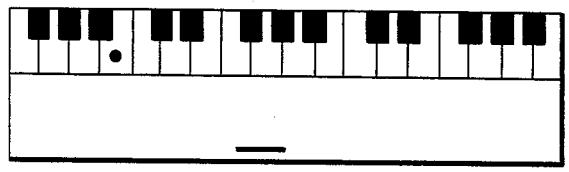
F I G. 16B
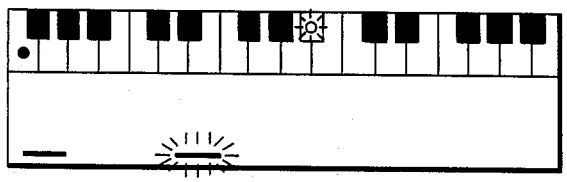
F I G. 16C
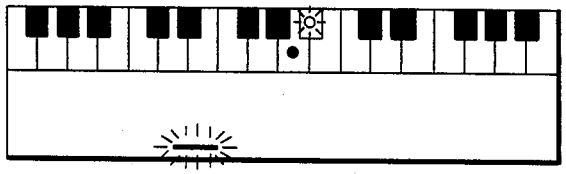
F I G. 16D
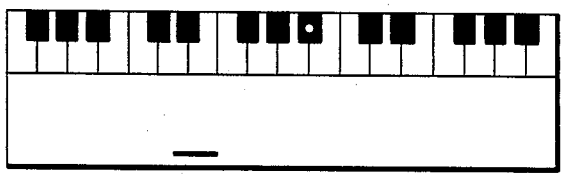
F I G. 16E

| 1 | AIR FOR THE G STRING (J.S. BACH) |
| 2 | CAMPTOWN RACES (FOSTER) |
| 3 | FOGGY MOUNTAIN BREAKDOWN (E. SCRUGGS) |
| 4 | ------- |
| 5 | ------- |
| 6 | ------- |
| | |
| 20 | HOLY NIGHT |

AUTOMATIC MUSIC PLAYING APPARATUS

BACKGROUND OF THE INVENTION

The present invention relates to an automatic music playing apparatus using a magnetic recording/reproduction device and a digital memory.

Conventionally, recording of music sources as analog signals and their reproduction (playing) have been widely performed using magnetic tapes. However, according to this technique, the play time is equal to the tape travel time, so that only about 20 popular music pieces at most can be recorded on a single cassette tape.

In order to increase the number of music pieces to be so stored, the KCS (Kansas City Standard) method or the like is proposed. According to this data conversion method, music piece data stored in a digital memory is recorded as digital data on a magnetic tape. Music data corresponding to one music piece can be recorded in a time interval corresponding to a tape travel time of 15 to 20 seconds. Therefore, 200 to 300 popular music pieces can be recorded on a single cassette tape. In the play mode, desired music piece data prerecorded on the cassette tape can be transferred to the digital memory at any time, thereby performing automatic play.

There often arises a demand for replacing a prerecorded music piece data with another music piece data. In this case, if the new music piece data is longer than the old music piece data it is to replace, in the conventional method the new music piece data cannot replace the old, resulting in inconvenience.

SUMMARY OF THE INVENTION

It is an object of the present invention to provide an automatic music playing apparatus wherein any music piece data among a plurality of music piece data recorded as digital data on a magnetic recording medium can be replaced with new music piece data irrespective of music piece data lengths.

In order to achieve the above object of the present invention, there is provided an automatic music playing apparatus comprising: a musical data input device for entering music information as digital data; a digital memory for temporarily storing digital musical data from said musical data input device; a magnetic recording/reproduction device for recording the digital musical data temporarily stored in said digital memory and for reproducing the digital musical data from said digital memory; and a musical data transfer control device for transferring as fixed-length data the digital musical data in said digital memory to said magnetic recording/reproduction device and for transferring the digital musical data stored in said magnetic recording/reproduction device to said digital memory, said musical data transfer control device being coupled between said digital memory and said magnetic recording/reproduction device.

BRIEF DESCRIPTION OF THE DRAWINGS

FIGS. 11 to 14 are respectively flow charts for explaining the operations of the apparatus shown in FIG. 2;

FIG. 15 shows the steps of data entry to a file program memory;

FIGS. 16A to 16E respectively show operation display modes of the display unit;

FIG. 18 is a data format on the magnetic tape;

FIG. 19 shows a display state of the display unit;

FIG. 20 is a table showing the storage contents as different music pieces which are numerically ordered.

DETAILED DESCRIPTION OF THE PREFERRED EMBODIMENTS

Figure 1:
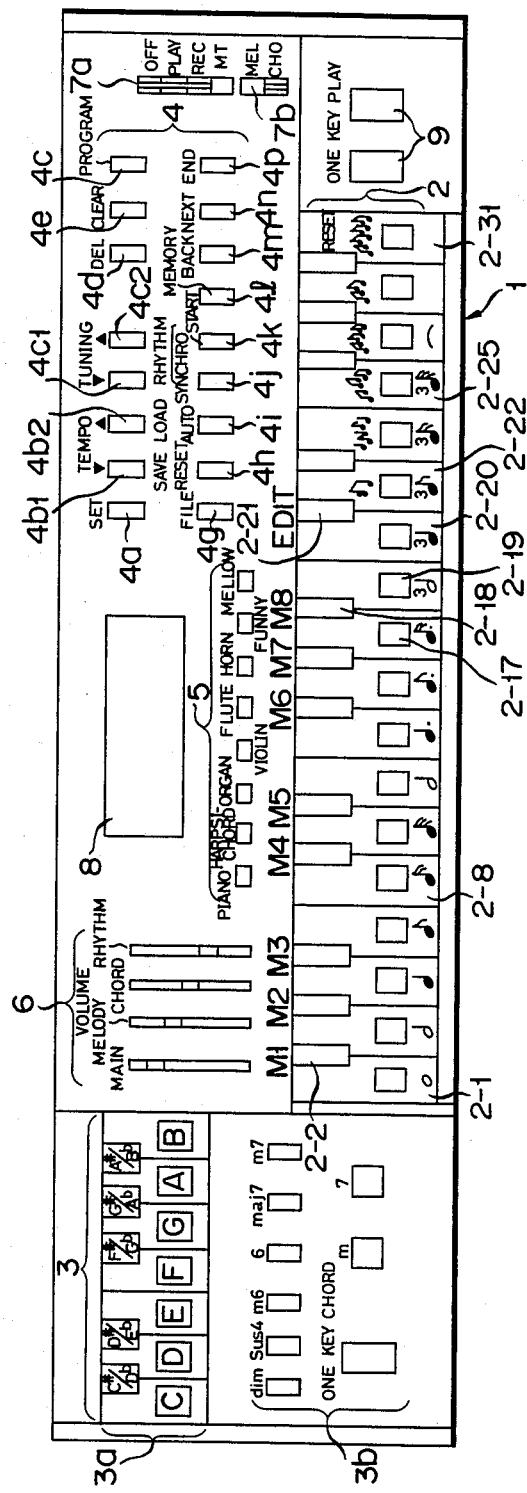
FIG. 1 is a plan view of an automatic music playing apparatus according to an embodiment of the present invention.

An automatic music playing apparatus according to an embodiment of the present invention applied to a keyboard electronic musical instrument will be described with reference to the accompanying drawings. Referring to FIG. 1, the electronic musical instrument of this embodiment has a rectangular case 1. A keyboard 2 having 31 keys 2-1 to 2-31 for a two-and-a-half octave scale is disposed on the upper front surface of the case 1. When a player depresses the key 2-1, the lowest note F1 of this keyboard 2 is produced. When the player depresses keys 2-8, 2-20 and 2-31, notes C2, C3 and B3 are produced, respectively. The keys 2-1 to 2-31 are also used for designating digital memory area, note length, and rhythm in accordance witn mode switching to be described later. Various types of keys are arranged in the upper rear portion of the case 1: chord designation keys 3; control keys 4 for causing a digital memory (to be described later) to store music information in a digital form and for causing a magnetic tape to record the digital data thereon; tone color selection keys 5 for selecting a desired tone color; volume control switches 6; mode selection switches 7a and 7b; and a display unit 8. One-key play keys 9 are arranged at the right-hand side of the keyboard 2.

The keyboard 2 has 31 keys 2-1 to 2-31 described above for producing sounds from "Fa" (F1) of the first octave to "Si" (B3) of the third octive. Ten left white keys (i.e., keys 2-1, 2-3, 2-5. 2-7, 2-8, 2-10, 2-12, 2-13, 2-15 and 2-17) among the keys 2-1 to 2-31 are also used to respectively designate durations of notes (pitches) and chords of a given musical piece stored in the digital memory. The five white keys 2-19, 2-20, 2-22, 2-24 and 2-25 are also used to respectively designate desired rhythms, such as a waltz. The white keys 2-22, 2-24, 2-25, 2-27, 2-29 and 2-31 are also used to designate arpeggio patterns, respectively. The eight black keys 2-2, 2-4, 2-6, 2-9, 2-11, 2-14, 2-16 and 2-18 are also used to designate eight memory areas M1 to M8, respectively. The key 2-21 is also used to designate memory editing.

The chord designation keys 3 comprise root designation keys 3a and chord sort selection keys 3b. The control keys 4 comprise a set (SET) key 4a, tempo (TEMPO) keys 4b1 and 4b2, tuning (TUNING) keys 4c1 and 4c2, a delete (DEL) key 4d, a clear (CLEAR) key 4e, a program (PROGRAM) key 4f, a file (FILE) key 4g, a reset (RESET) key 4h, an automatic play (AUTO) key 4i, a synchronizing start (SYNCHRO) key 4j, a start (START) key 4k, a memory (MEMORY) key 4l, a back (BACK) key 4m, a next (NEXT) key 4n, and an end (END) key 4p. The tempo keys 4b1 and 4b2 are also used as data SAVE and LOAD keys, respectively, in a tape recorder (MT) mode to be described later.

The tone color selection keys 5 comprise eight keys for designating tones as piano, harpsichord, organ, violin, flute, horn, funny and mellow, respectively. These tone color selection keys 5 are also used as block designation keys for designating the eight recording areas or blocks, respectively, on the magnetic tape shown in FIG. 3. Each block is further divided into 31 data areas respectively corresponding to the 31 keys of the keyboard 2. Therefore, a desired data area among 248 (=8×31) data areas can be designated by one of the eight tone color selection keys 5 and one of the 31 keys of the keyboard 2.

The mode selection switch 7a is used to set one of the following: a power-off (OFF) mode, a musical performance (PLAY) mode, a recording (REC) mode, and the tape recorder (MT) mode. In the REC mode, music piece data is written in the memory. In the MT mode, the music piece data is recorded (saved) on the magnetic tape, and the music piece data on the magnetic tape is loaded in the memory to perform automatic play. When the switch 7a is set to the PLAY mode, the mode selection switch 7b is used to designate whether is stored as music piece data in the digital memory melody data or chord data.

The display unit 8 comprises a liquid crystal display to be described in detail later.

A circuit board, batteries, and a loudspeaker are arranged in the case 1. A jack is disposed at the side wall of the case 1 to electrically connect the circuit board to an external tape recorder.

The circuit configuration of the electronic musical instrument will now be described with reference to FIG. 2. An output from a depressed key among the keys 2-1 to 2-31, an output from a depressed key among the chord designation keys 3, an output from a depressed key among the control keys 4, an output from a depressed key among the tone color selection keys 5, an output from an operated switch among the volume control switches 6, outputs from the mode selection switches 7a and 7b, and an output from the one-key play key 9 are supplied to a CPU 11. The CPU 11 controls the overall operation of the electronic musical instrument and comprises a microprocessor of a one-chip LSI (large scale integrated circuit). When the player plays a musical piece with the keyboard 2 in the PLAY mode, the CPU 11 supplies tone generation data to a tone generator 12. A tone signal generated by the tone generator 12 is amplified by an amplifier 13 and is produced as a musical sound at a loudspeaker 14. When the player selectively depresses the keys 2-1 to 2-31 and the chord designation keys 4 at the top of the case 1 in the REC mode, the CPU 11 supplies note data (i.e., music data) of a musical piece to a RAM (random access memory) 15. In this case, melody data and chord data of the music data are separately supplied to the RAM 15.

The data storage operation in the REC mode will now be described with reference to FIGS. 3 to 7 wherein the melody data and the chord data are separately stored in the RAM 15. The player sets the mode selection switch 7a at the REC position and the mode selection switch 7b at the melody (MEL) position. Assume that the player depresses the key 2-20 of the keyboard 2 to enter melody data corresponding to " ♩ + ♩ ". The key 2-20 corresponds to the note C3. Therefore, this melody data has a data format shown in FIG. 3. When the key 2-20 is depressed, pitch data indicating C3 is formed by one byte. Subsequently, note duration data corresponding to a quarter note is formed by one byte. When the key 2-20 is released, one-byte data indicating the OFF operation of the key 2-20, and one-byte data indicating a quarter rest are formed.

Figure 3:
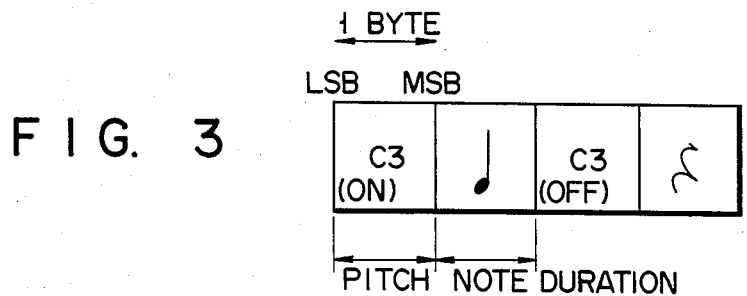
FIGS. 3 to 6 are views respectively showing data formats of data stored in a RAM.
Figure 4:
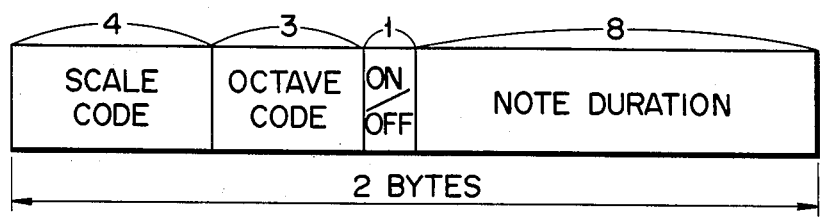

As shown in FIG. 4, the first pitch data shown in FIG. 3 comprises first 4-bit data (including the LSB) corresponding to a scale code indicating "do", followed by 3-bit data corresponding to an octave code indicating the third octave, and the MSB indicating the ON/OFF state of the key. The melody note duration is indicated by 8-bit data following the ON/OFF data.

Figure 5:
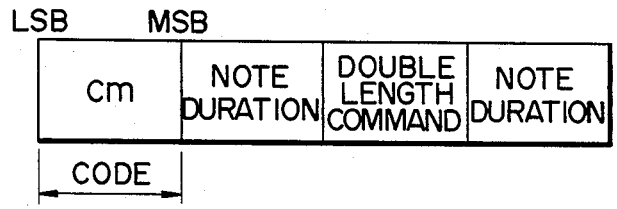

When the player sets the mode selection switch 7b in the CHO (chord) position in the REC mode, chord data corresponding to the melody data is entered. In fact, the chord is Cm, and its data is designated by one-byte data at the left in FIG. 5. The next one-byte data indicates the lower-bit data of the tone duration of chord Cm as will be described later. The third byte data in FIG. 5 is a double-length command. When the double-length command is set, the tone duration of the preceding chord Cm is doubled. The upper bit data of the tone duration data by the doubling is shown in the fourth byte in FIG. 5. Thus, by using this duration area of the fourth byte as upper bit of chord duration area of the second byte, a chord duration of long duration can be recorded.

Figure 6:
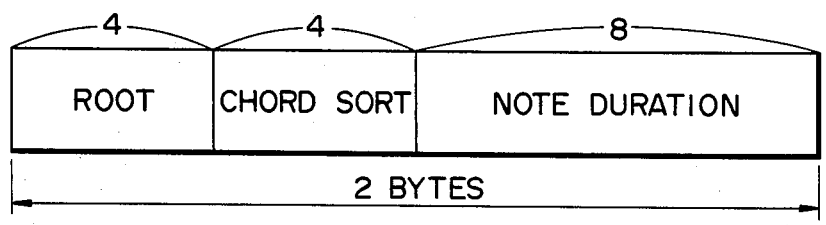

The chord Cm is indicated by a root designated by 4-bit data including the LSB, and a chord sort designated by 4-bit data following the 4-bit root data, as shown in FIG. 6. The following 8-bit data indicates the one-byte chord duration data.

Figure 7:
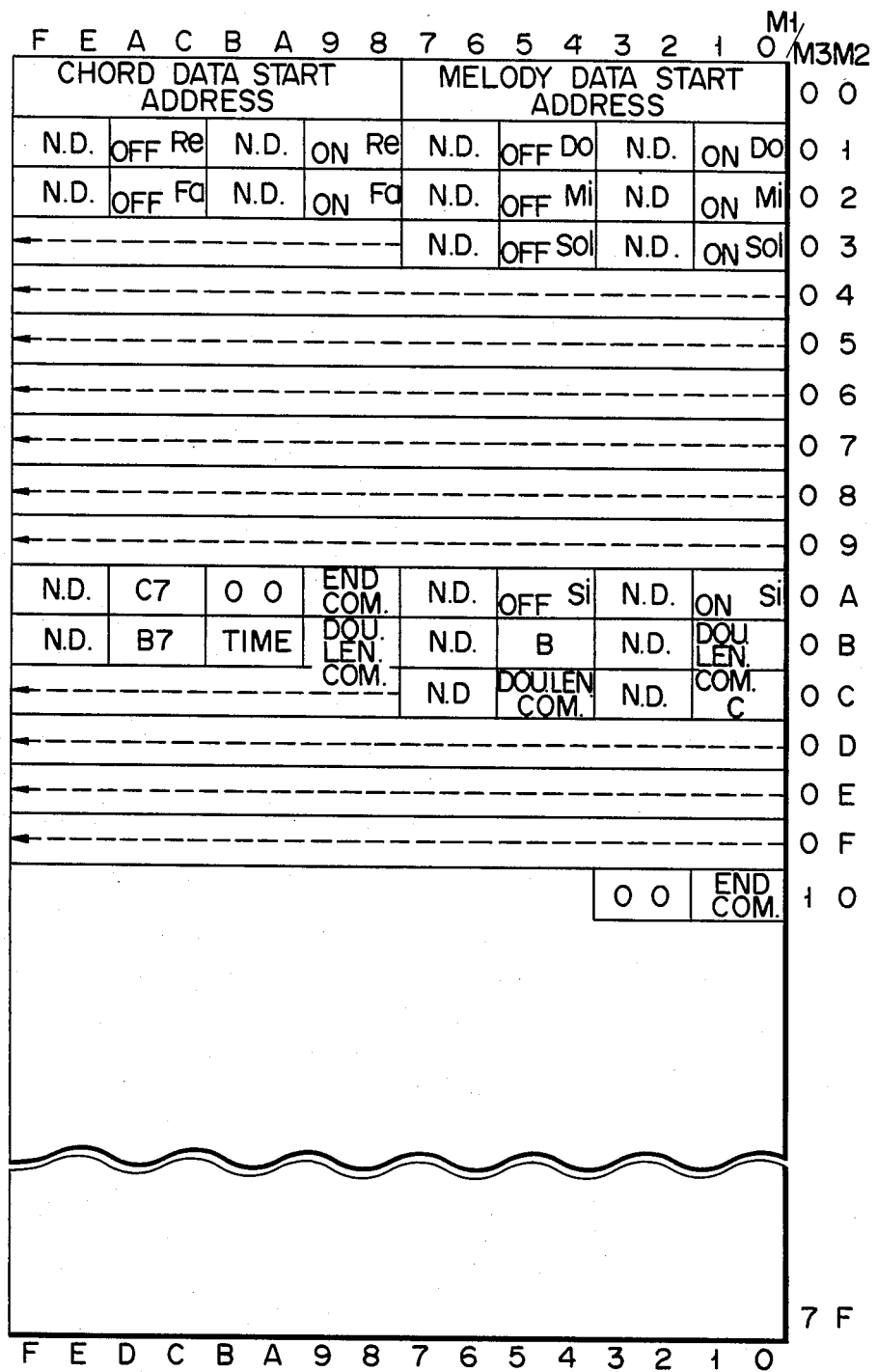
FIG. 7 is a diagram showing an arrangement of data stored in the RAM.

FIG. 7 shows an 8-kbyte- RAM 15 having 16 row hexadecimal digits and 128 column hexadecimal digits. The data areas of the melody and chord have variable-lengths, respectively. Each data area is designated by an address counter (not shown) using twelve hexadecimal digits (four row hexadecimal digits and eight column hexadecimal digits). Addresses for designating column direction are denoted as M3 and M2, while addresses in the row direction are denoted by M1. Areas designated by the M3, M2 and M1 as 000 to 007 are provided for storing data indicating the melody start address. In the areas designated by 008 to 00F is stored a data indicating the chord start address. When the melody data is set as do re mi fa sol, ... as shown in FIG. 7, the addresses M2 and M3 are set to be A and 0, respectively, and the address M1 is set to be 8 and 9, the end command of the melody data is stored. Two bits of 0, 0 follow and then the chord data indicating $C_7$ follow. Chord data is followed by the two-bit end command designated by the addresses M2 and M3 set to be 0 and 1, respectively and the address M1 set to be 0 and 1 (corresponding to one byte). Then, one-byte dummy duration data follows, thereby completing storage of the chord data. In the musical piece, the remaining memory areas of the RAM 15 are left. In this case, the melody data is first stored and the chord data is then stored. Alternatively, the chord data may be first stored and the melody data may follow.

The music data of one music piece which is stored in the RAM 15 is read out in the MT mode and is saved on a magnetic tape 17a in a tape recorder 17 through the CPU 11 and an MT interface 16. The digital music piece data stored in the RAM 15 is converted to digital signals to be suitably recorded on the tape 17a in the tape recorder 17 in accordance with, for example, Kansas City Standard method. An interface disclosed in U.S. Pat. application Ser. No. 475,109 of the same assignee can be suitably used as the MT interface 16 shown in FIG. 2.

In the PLAY mode, the music piece data is transferred to the tone generator 12 to perform automatic play or for one-key play with the one-key play keys 9. The data is read out from or written in the RAM 15 in response to a read/write control signal R/W from the CPU 11.

Figures 8, 9:
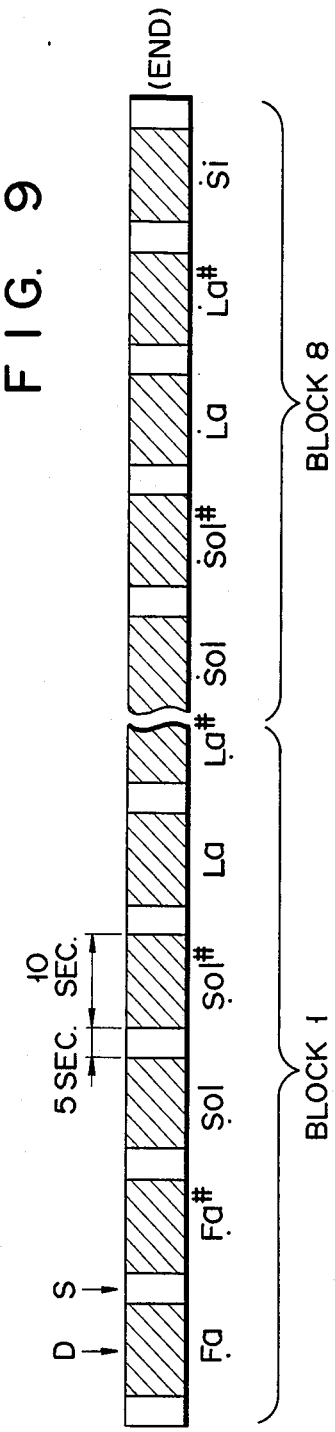
FIG. 8 is a table showing the relationship between tone selection keys and block areas of the magnetic tape.
FIG. 9 is a representation showing the data area of the magnetic tape.

The magnetic tape 17a is divided into eight blocks which are respectively designated by the operation of the tone color selection keys 5, as shown in FIG. 8. Each block is further divided into 31 data areas respectively designated by the 31 keys 2-1 to 2-31, so that the blocks have a total of 248 data areas, as previously described. FIG. 9 shows part of the 248 data areas of the magnetic tape 17a. Reference symbols Fa, Fa#, Sol, ... denote Fa (F1), Fa#(F#1) Sol (G1), ... of the first octave, respectively. Reference symbols Sol, Sol#, La, ... , and Si denote Sol (G3), Sol#(G#3), La (A3), ..., and Si (B3) of the third octave, respectively. Each data area has an identical memory capacity, and the combined data areas have the same capacity as that of the RAM 15. The musical data of one music piece which are transferred from the RAM 15 in the SAVE mode are converted by the interface 16 in accordance with, for example KCS (Kansas City Standard) method and are stored as digital signals in the corresponding data area. In this case, as shown in FIG. 9, each data area has both music piece data and interjacent data S for distinguishing one music piece data from another music piece data. A pair of data consisting of the music piece data and the interjacent data D is stored in each data area. Music piece data and the interjacent data S in a given data area are reproduced for ten seconds and five seconds, respectively, while the magnetic tape 17a is travelling. The interjacent data is produced as a 20 Hz low-frequency signal by the CPU 11.

The musical data saved on the magnetic tape 17a is transferred to the RAM 15 in units of music pieces in the LOAD mode. The musical data of one music piece is then transferred to the tone generator 12, thereby performing automatic playing. The record/play operation of the tape recorder 17 is controlled in response to a tape control signal supplied from the CPU 11 through a control line CL.

A data counter 18 indicates the present data area of the magnetic tape 17a so as to determine the present travel position of the magnetic tape 17a. The data counter 18 can be reset by a reset signal R from the CPU 11 and can perform count-up operations in response to a +1 signal from the CPU 11. A count output of the data counter 18 is supplied to one terminal of a coincidence circuit 20. The count output is also supplied to a driver 21 and is displayed at the display unit 8 as the present data position.

A file program memory 19 stores data area position data designated by the FILE key 4g, one of the tone selection keys 5, one of the keys of the keyboard 2, and the SAVE key 4b1 when the one-piece music data in the RAM 15 is saved in a given data area of the magnetic tape 17a. In order to continuously perform automatic play by specifying a plurality of music-piece data stored in the magnetic tape 17a, data area position data of these music pieces are written by the FILE key 4g, the PROGRAM key 4f, keys of the tone color selection keys 5, keys of the keyboard 2, and the END key 4p. The data stored in the file program memory 19 is supplied to the other terminal of the coincidence circuit 20 and to the driver 21. The coincidence circuit 20 detects a coincidence/noncoincidence of two input signals. When the two input signals coincide with each other, the coincidence circuit 20 supplies a coincidence signal eq to the CPU 11 which then executes predetermined processing. A signal TPS is supplied to the CPU 11 upon depression of the FILE key 4g.

The driver 21 comprises a drive circuit for driving the display unit 8 constituted by a liquid crystal display. The driver 21 supplies both a common signal and a segment signal to electrodes of the display unit 8 to dynamically drive the display unit 8.

Figure 10A:
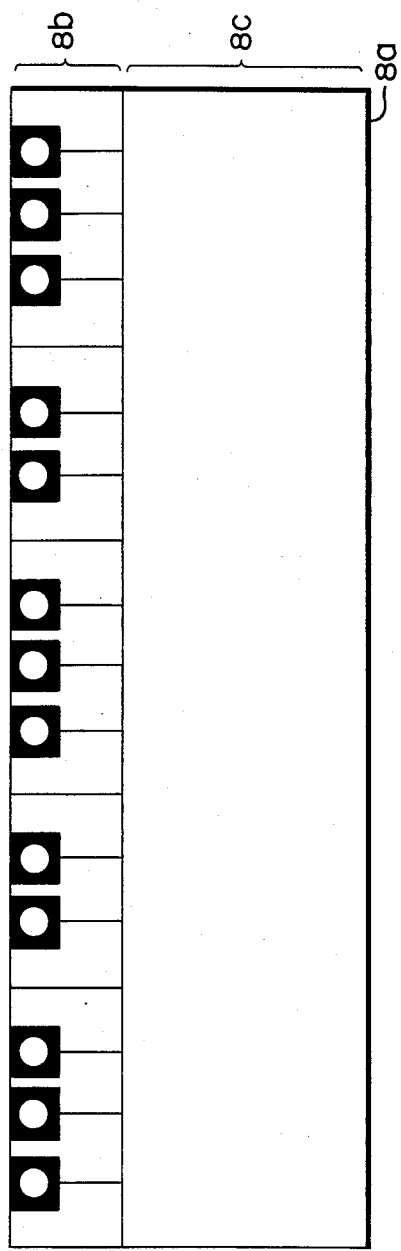
FIG. 10A is a view showing an OFF state of a display unit.
Figure 10B:
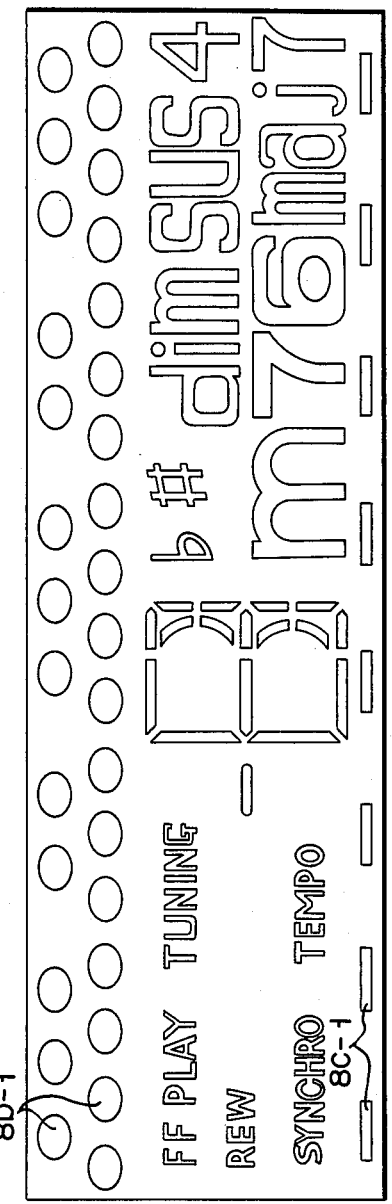
FIG. 10B is a view showing an arrangement of segments of a display unit.

FIG. 10A shows a liquid crystal display panel 8a of the display unit 8. The liquid crystal display panel 8a comprises a scale display portion 8b for displaying keys in a keyboard manner and a character display portion 8c arranged below the scale display portion 8b to display chords and other performance information. The liquid crystal display panel 8a has a display segment configuration as shown in FIG. 10B so as to display melody scale, chord names, chord positions, and preset rhythm states. By a combination of 31 circular display elements 8b-1 of the scale display portion 8b and eight bar display elements 8c-1 which are disposed on the character display portion 8c so as to correspond to the eight tone color selection keys 5, the data area of the magnetic tape 17a can be displayed. Display elements indicating characters "FF" and "REW" designate the forward travel mode and the rewind travel mode of the magnetic tape 17a under the control of the CPU 11.

The operation of the electronic musical instrument of this embodiment will be described with reference to FIG. 11 to FIGS. 16A to 16E. First, the SAVE operation of the musical data of one music piece on the magnetic tape 17a after this music piece data is stored in the RAM 15 will be described. In order to store the music piece data in the RAM 15, the player sets the mode selection switch 7a in the REC position. A write control signal W of the read/write control signal R/W is applied to the RAM 15. Pitch data for the notes of a melody are sequentially entered using the corresponding keys at the keyboard 2. When a series of pitch data are entered, the note duration data respectively corresponding to the pitch data are entered using the proper white keys among the keys shown in FIG. 1. When the melody data of the music piece are stored in the RAM 15, chord data and chord duration data are entered selectively using the chord selection keys 3.

When the musical data of one music piece are stored in the RAM 15, the player switches the mode selection switch 7a to the MT position. A read control signal R of the read/write control signal R/W is then applied to the RAM 15. The player then depresses the FILE key 4g to rewind the magnetic tape 17a. The signal TPS is generated upon depression of the FILE key 4g and is applied to the CPU 11. The CPU 11 then performs control operation as shown in the flow chart in FIG. 11. The magnetic tape 17a is rewound by a drive motor (step S1). The CPU 11 supplies the reset signal to the data counter 18 which is then reset (step S2). Furthermore, the count output from the data counter 18 is supplied to the driver 21. The start file portion, the start data area of the magnetic tape 17a, or the first data area (i.e., position which holds the music data of the first music piece of the first block) is displayed (step S3). In this case, the leftmost bar like display element 8c-1 indicating the first block turns on in the character display portion 8c and the circular display element 8b-1 indicating Fa (F1) of the first octave turns on in the scale display portion 8b.

In this manner, when the magnetic tape 17a is completely rewound, the player depresses the SAVE key 4b1 to save the music data of the first music piece in a data area of the RAM 15. The CPU 11 executes the routine of the flow chart shown in FIG. 12. Step S1 checks whether or not any blank data areas are left (i.e., whether or not the magnetic tape has reached its end is checked). If blank data areas are in fact left, step S2 is started. In step S2, the CPU 11 first creates an interjacent portion by recording for 5 seconds data of a 20 Hz low-frequency interjacent data from the start position of the first blank data area in accordance with the KCS method. The first music data is then transferred from the RAM 15 and is recorded following the interjacent data. In the SAVE mode of the music piece data, whether or not the SAVE operation is completed is always checked (steps S3 and S4). When about 10 seconds have elapsed, the music piece data can be completely saved, and the routine advances to step S5. After the music piece data, the next interjacent portion is formed by travelling the magnetic tape 17a for about 2.5 seconds while the low-frequency interjacent data is recorded on the magnetic tape 17a. After the interjacent data is recorded, the tape recorder 17 receives a signal from the CPU 11 through the line CL and stops tape travel. The +1 signal is then supplied from the CPU 11 to the data counter 18, and the count of the data counter 18 is incremented to "1", so that the second data area is designated (step S6). Thereafter, the RAM 15 is cleared to delete the first music piece data.

In order to store a second music piece data in the second data area, the same operation is performed in the same manner as for the first music piece data. In this case, in order to save the music piece data from the RAM 15 on the magnetic tape 17a, as shown in the routine after step S2 of the flow chart in FIG. 12, the magnetic tape 17a travels for about 2.5 seconds before the second music piece data is recorded, so that a total of 5-second tape travel for the low-frequency interjacent data is performed in combination with the operation of step S5. When 248 music pieces are respectively stored in the first to 248th data areas, no data area is left. This can be detected by step S1 of the flow chart in FIG. 12, and subsequent music piece data storage is prohibited. The position of the data area for the 100th music piece is illustrated in FIG. 16B. In the above embodiment, the interjacent data created by the CPU 11 is recorded on the magnetic tape 17a while the music piece data is being written from the RAM 15 to the tape 17a. However, the interjacent data can be prestored in the RAM 15.

Figure 13:
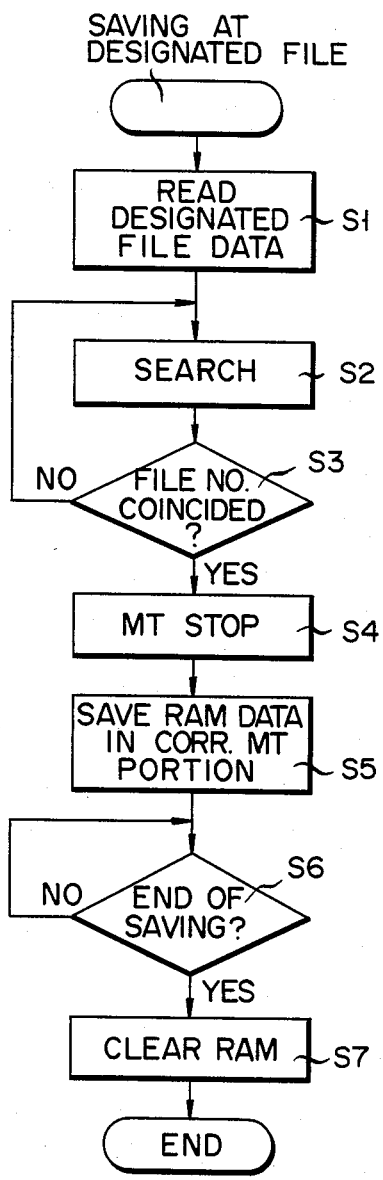

The musical data replacement operation will be described in detail with reference to the flow chart in FIG. 13 wherein a specific data area of the magnetic tape 17a is designated to have the music piece data stored therein replaced with new music piece data. Assume that the music piece data to be replaced is prestored in the RAM in the manner as described above, and that the music piece data prestored in the RAM is the 80th music piece data in the 80th data area. The player sequentially depresses the FILE key 4g, the ORGAN key of the tone color selection keys 5 which designates the third block, the A#2 key for designating the 80th data area, and the SAVE key 4b1. When the FILE key 4g is depressed, the routine of the flow chart in FIG. 11 is executed to rewind the magnetic tape 17a and reset the data counter 18. At the same time, the first data area is displayed at the display unit 8. A value "79" is preset in the file program memory 19 to show the 80th data area. The data "79" is supplied to the coincidence circuit 20 and the driver 21. In this situation, while the first data area of the rewound magnetic tape 17a is displayed at the display unit 8 (FIG. 16C), the display element indicating the position of the 80th data area flashes (FIG. 16C). When the SAVE key 4b1 is depressed, the routine of the flow chart in FIG. 13 is started.

After the data "79" is supplied from the file program memory 19 to the coincidence circuit 20 in step S1, the data counter 18 performs the count-up operation and compares its count with the data "79" until the coincidence circuit 20 generates a coincidence signal eq of logic "1?. At the same time, the 80th data area is searched. In this case, the magnetic tape 17a travels in a direction so as to increase its data area number by one every time the count of the data counter 18 is increased by one. Along with this tape travel, the changing count of the data counter 18 is sequentially displayed at the display unit 8. FIG. 16D illustrates the condition that the present search position of the ON display element is near the 79th data area. When the count of the data counter 18 has reached 79 indicating the 80th data area, the coincidence circuit 20 supplies the coincidence signal eq of logic "1" to the CPU 11. Therefore, the magnetic tape 17a is stopped immediately before the 80th data area (step S4). At the same time, this condition is displayed at the display unit 8, as shown in FIG. 16E. The new music piece data is transferred from the RAM 15 to the magnetic tape 17a and replaces the old music piece data (step S5). During this period, it is checked whether or not the SAVE operation is completed (step S6). When the SAVE operation is completed, the music piece data in the RAM 15 is cleared in step S7. In this embodiment, the data in the RAM 15 is cleared after the SAVE operation is completed. However, the data need not be cleared after the SAVE operation. By so doing, it is possible to reproduce the musical piece saved from the RAM 15 without reloading the data saved to the magnetic tape 17a.

Another performance will be described with reference to FIG. 15 and the flow chart in FIG. 14 wherein a plurality of music pieces are selected by the file program memory 19 from the music pieces stored in the magnetic tape 17 so as to continuously and automatically play these musical pieces.

In this case, as shown in key entry step (1) of FIG. 15, the player depresses the FILE key 4g to rewind the magnetic tape 17a and to reset the data counter 18. When the 87th music piece is selected, the player depresses the PROGRAM key 4f, the ORGAN key of the tone color selection keys 5, and the key indicating F3 (Fa of the third octave). The data "86" indicating the 87th music piece is entered in the file program memory 19 and is also displayed at the display unit 8. Key entry steps (3), (4), (5) and (6) indicate that the 15th, 175th, 219th and 60th music pieces are designated, respectively. It should be noted that Sol of the key entry step (3) in FIG. 15 indicates Sol of the second octave. After five music pieces are designated, the player depresses the END key 4p and then the LOAD key 4b2 to start the routine of the flow chart in FIG. 14.

Figure 14:
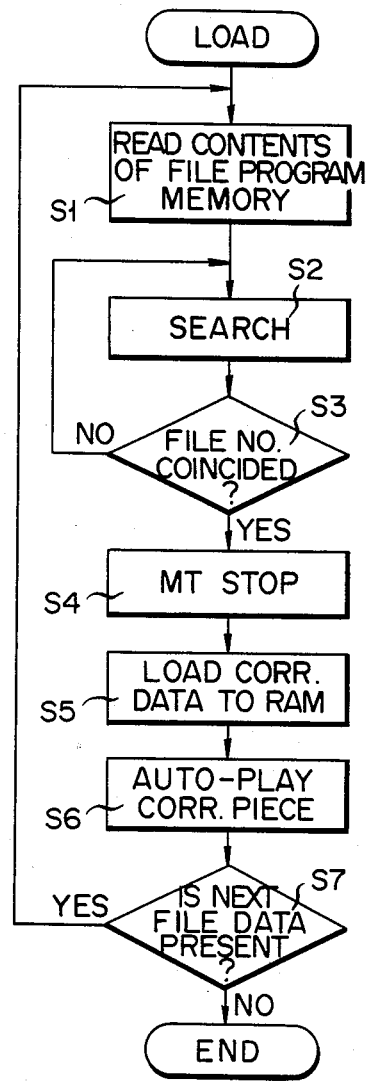

Referring to FIG. 14, in step S1, the data "86" indicating the 87th music piece as the first piece for automatic performance is read out from the file program memory 19 and is supplied to the coincidence circuit 20. The count of the data counter 18 is incremented by 1, so that the magnetic tape 17a travels in units of data areas. The 87th data area is searched in steps S2 and S3. When the 87th data area is searched, the magnetic tape 17a is stopped (step S4), and the music data of the 87th music piece are read out from the 87th data area and are loaded in the RAM 15 (step S5). The music piece data loaded in the RAM 15 are sequentially transferred to the tone generator 12 and automatic performance of this music piece is executed (step S6). When this music piece is finished, the routine advances to step S7. Step S7 checks whether or not the next file data is present (i.e., whether or not data of the next designated music piece is present in the file program memory 19 is checked). Then, the routine returns to step S1. The second designated music piece (i.e., the fifteenth music piece on the magnetic tape 17a) is then automatically performed. For this purpose, steps S1 to S7 are executed. Steps S1 to S7 are repeated for the third to fifth music pieces, respectively. In this case, the data counter 18 is reset at the start position of tape rewinding, so the data position coincides with the count of the counter, and the tape need not be rewound. Therefore, the data search can be directly performed.

In the above embodiment, 248 music pieces can be recorded on the magnetic tape. However, the number of music pieces is not limited to this number. Furthermore, the number of music pieces for automatic performance is not limited either. In the above embodiment, the display unit comprises a liquid crystal display. However, any other display means can be used as the display unit. Furthermore, the display mode of the data area positions of the magnetic tape is not limited to the mode of the above embodiment. For example, a letter "8" like segment display unit may be used to display the numeral. Furthermore, the capacity of the data areas may be arbitrarily given, so that the capacities of the music piece data and the interjacent data are also arbitrarily given. It is important to only record each music piece data as fixed-length data. Furthermore, digital recording method is not limited to the KCS method. SCS (Sapporo City Standard) or any other method may be used in place of the KCS method. A magnetic recording/reproduction apparatus using any magnetic recording medium (i.e., a magnetic disc and a magnetic sheet) other than magnetic tape may be used.

According to the embodiment described above, each music piece data temporarily stored in the digital memory is given as fixed-length data, and this fixed-length data is transferred to the magnetic recording apparatus. Therefore, even after a plurality of music piece data are recorded on the magnetic tape or the like, data replacement can be arbitrarily and easily performed, provided that the fixed-length is determined as long as a length equal to or larger than an average length of popular music pieces, for example. Alternatively, a RAM having a memory capacity large than the longest music data to be recorded on the magnetic tape may be used.

In the above embodiment, the +1 signal is supplied from the CPU 11 to the data counter 18 every time one music piece is read until the data area number preset in the file program memory 19 coincides with the count of the data counter 18. Alternatively, the number of interjacent data S between adjacent music data D may be counted by an interjacent number detector coupled between the CPU 11 and the interface 16, so that the interjacent number data instead of the count of the data counter 18 is supplied to the CPU 11.

Figure 2:
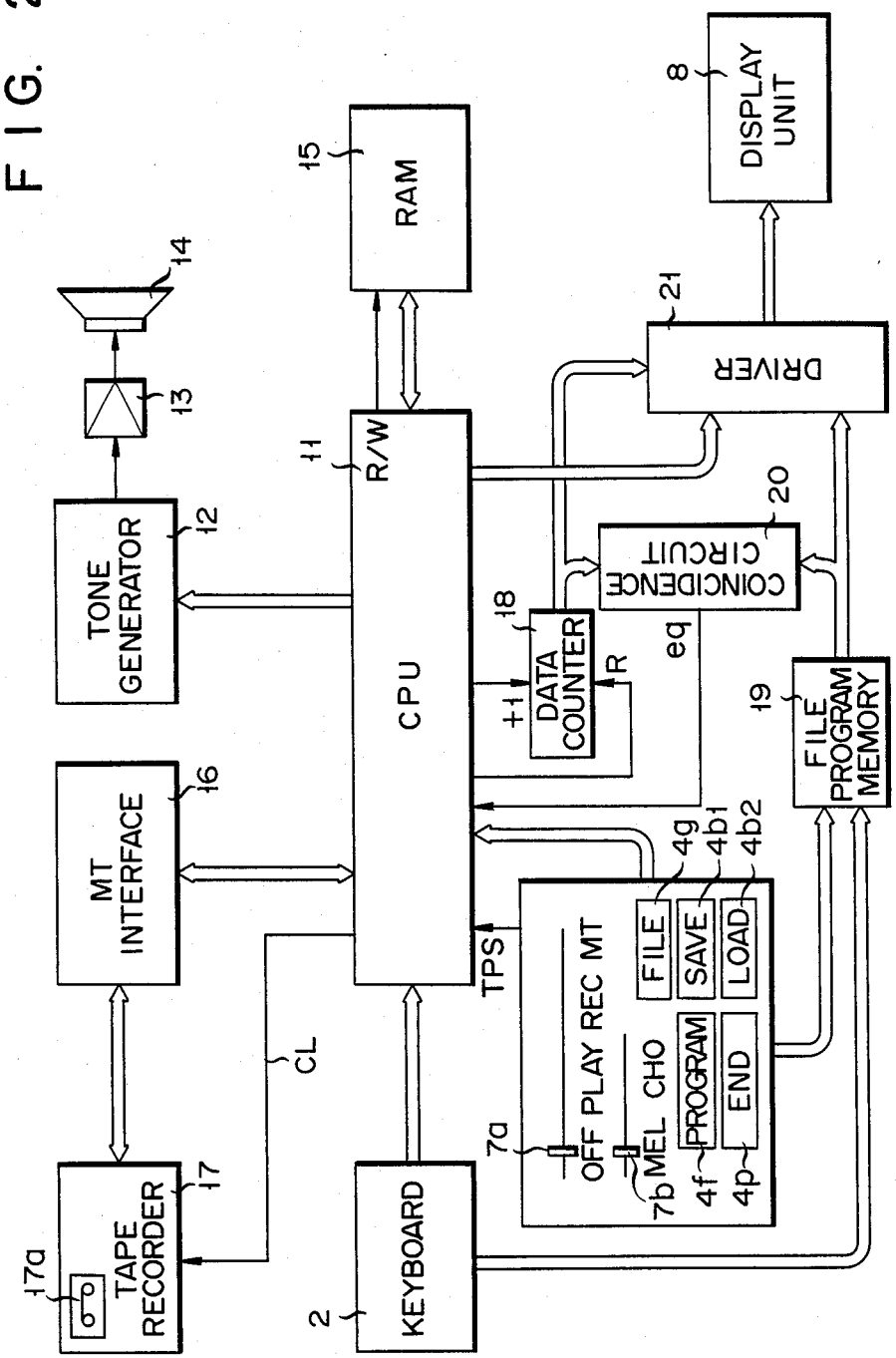
FIG. 2 is a block diagram showing the circuit configuration of the apparatus shown in FIG. 1.

In the embodiment shown in FIG. 2, the player sets the switch 7a in the PLAY position to play a musical piece the data of which is recorded on the magnetic tape 17a. In this condition, the music data on the magnetic tape 17a is loaded in the RAM 15. Then, the RAM 15 is accessed by the CPU 11, and the stored music data is supplied to the tone generator 12, thereby producing sounds at the loudspeaker 14. In another embodiment shown in FIG. 17, when data load from the magnetic tape 17a to the RAM 15 is completed, music pieces are automatically played.

Figure 17:
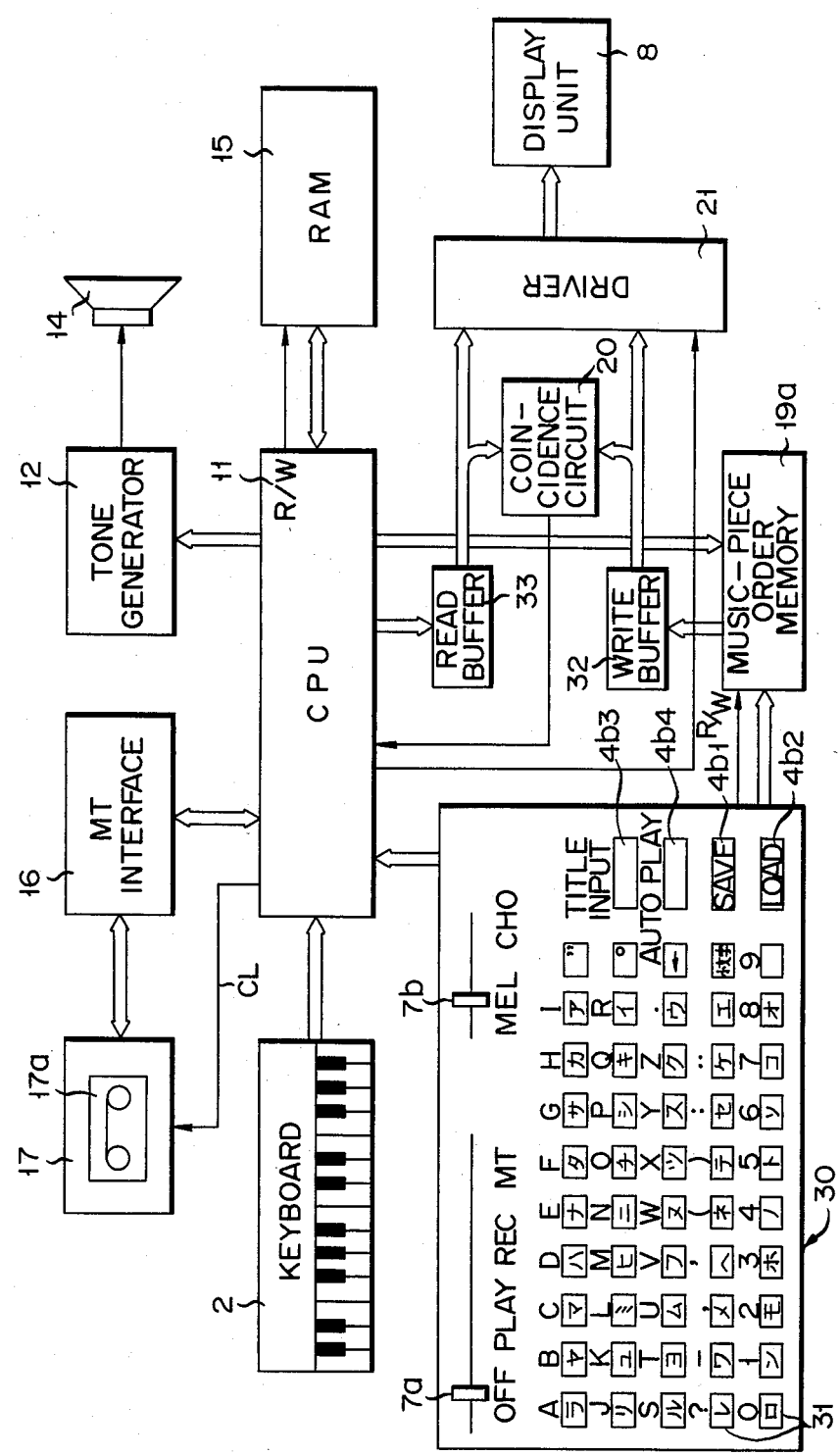
FIG. 17 is a block diagram of an automatic music playing apparatus according to another embodiment of the present invention.

The same reference numerals used in FIG. 17 denote the same or similar parts as in FIG. 2.

Data of at least one music piece together with music title data is recorded on a magnetic tape 17a in a format to be described later. The music data is transferred from the magnetic tape 17a to a CPU 11 through an MT interface 16 and is loaded in a RAM 15. This music data is then transferred to a tone generator 12 which then generates tone signals. Sounds are then produced at the loudspeaker 14.

A key input section 30 has keys 31, a title input key 4b3, a SAVE key 4b1, a LOAD key 4b2, and an automatic play (AUTO PLAY) key 4b4. In order to record the title data and the music data on the magnetic tape 17a, keys required among the keys 31, the SAVE key 4b1 and a keyboard 2 are used. In this case, the data format is illustrated in FIG. 18 wherein an interjacent blank portion is formed between the two adjacent music data. Each data area has title data T, a title END code TE, and music piece data D in the order named. Each music piece is recorded as serial data in a data format in accordance with the KCS method, for example.

In order to read out the music pieces recorded on the magnetic tape 17a in a given order and store them in a music-piece order memory 19a, the keys 31 and the title input key 4b3 are used. Data concerning twenty music pieces are stored in the memory 19a in the format shown in FIG. 20 such that each data has order data and title data. When the player depresses the title input key 4b3 or the LOAD key 4b2, a read/write control signal R/W is generated from the key-input section 31 and is applied to the memory 19a.

When the player designates the title name of only one music piece at the key-input section 31, a write buffer 32 receives title data through the memory 19a. On the other hand, when automatic play is effected in accordance with the order of the data (indicating a plurality of music pieces) in the memory 19a, the title data are sequentially read out and are written in the write buffer 32. Meanwhile, the title data read out from the magnetic tape 17a are written in a read buffer 33. The title data from the write buffer 32 and the read buffer 33 are compared by a coincidence circuit 20. When a coincidence is detected by the coincidence circuit 20, a coincidence signal is supplied to a CPU 11. In this condition, the title data is supplied to a driver 21 and is then converted to a display signal. The display signal is displayed at a display unit 8. At the same time, the CPU 11 causes the RAM 15 to store the corresponding music piece data. Therefore, automatic play is immediately started. The title data in the write buffer 32 and the read buffer 33 are supplied to the driver 21 and are then displayed at the display unit 8.

As shown in FIG. 19, the title is displayed in a dot matrix fashion on the display unit 8 such as a liquid crystal display unit.

Figure 21:
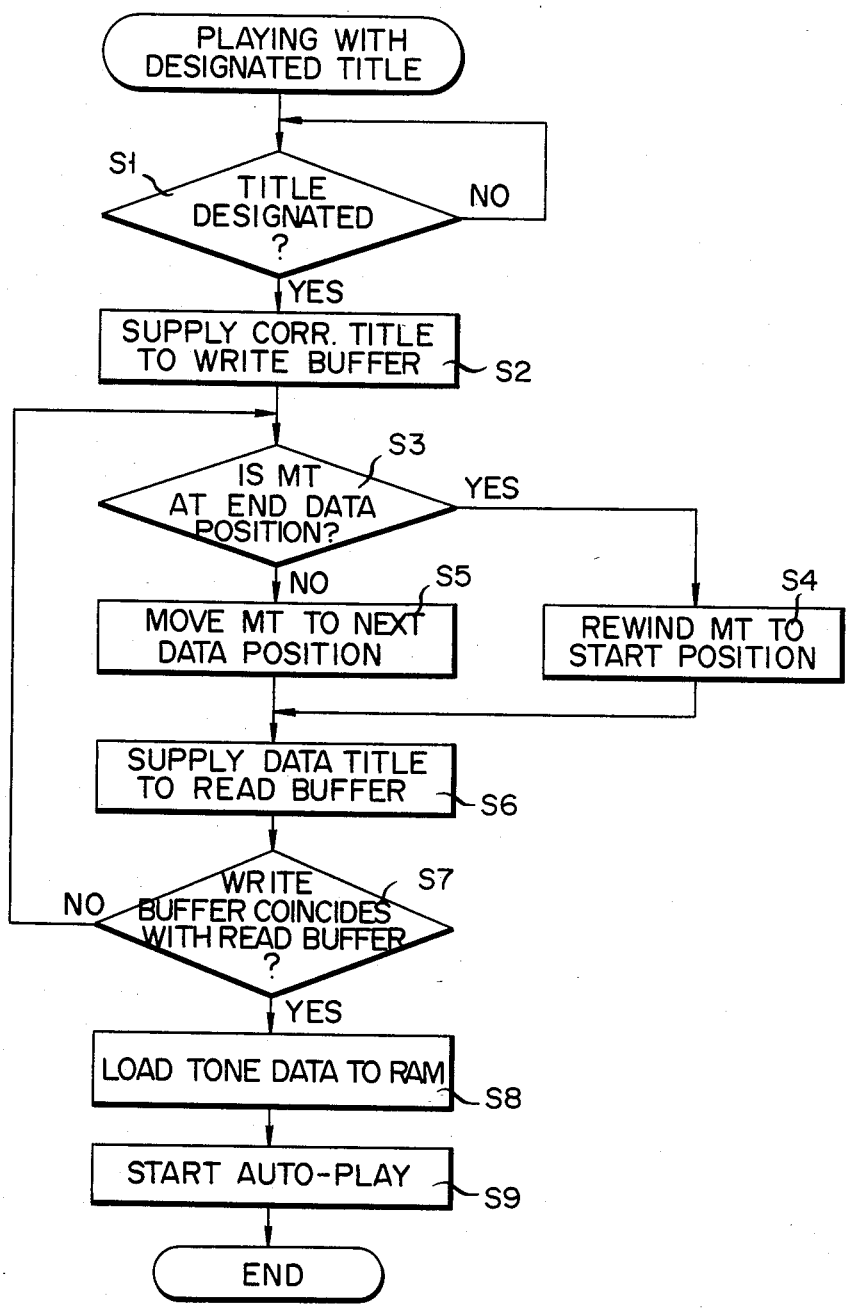
FIGS. 21 to 23 show respectively flow charts for explaining the operations of the apparatus shown in FIG. 17.
Figure 22:
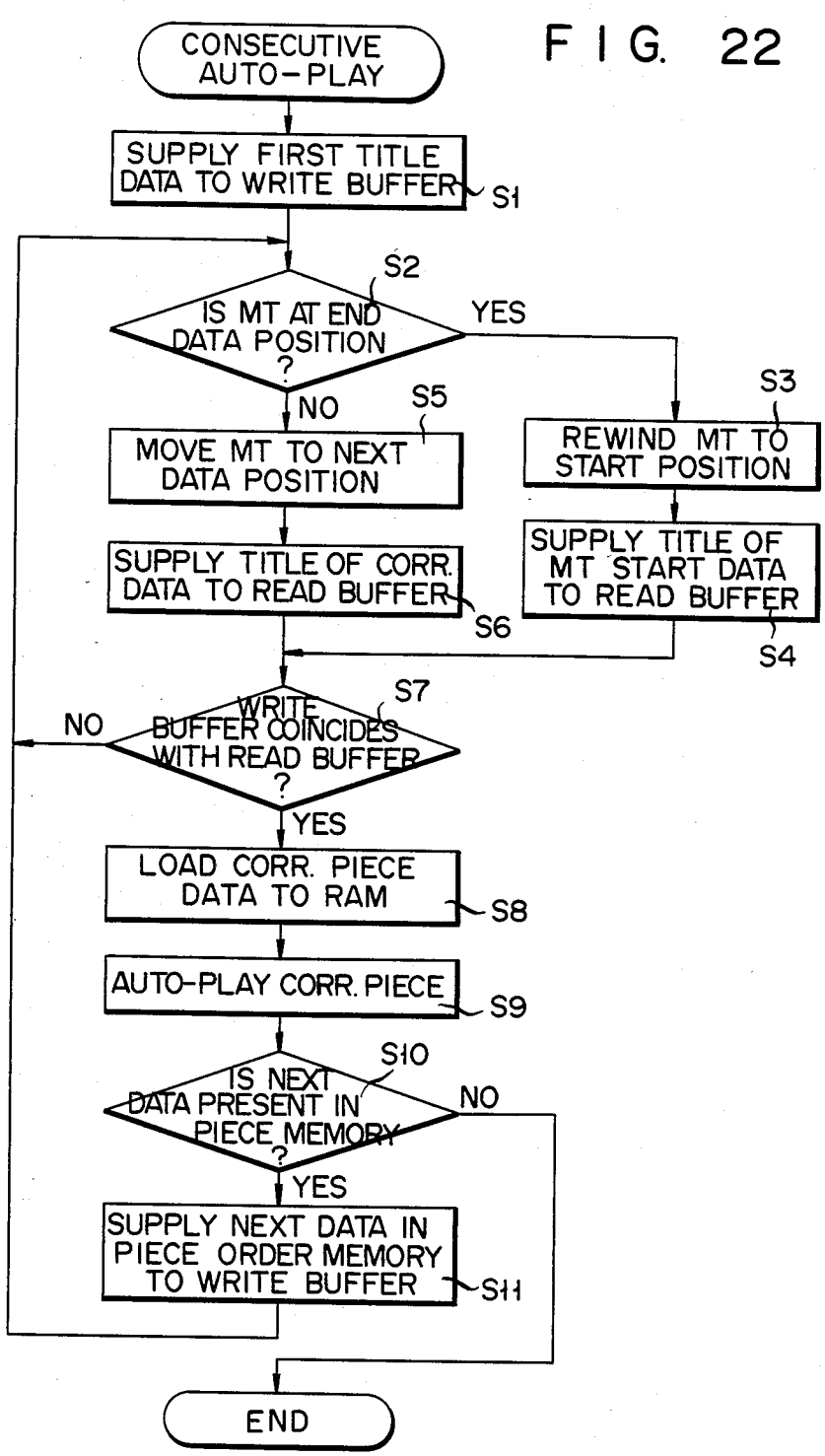

The operation of the apparatus shown in FIG. 17 will be described with reference to the flow charts in FIGS. 21 and 22. A plurality of music pieces are prerecorded on the magnetic tape 17a. In this case, each music piece is recorded as serial data in accordance with the format shown in FIG. 18. After the magnetic tape 17a is rewound to the start position, the player depresses the title input key 4b3 and keys 31 to input the title name of the first music piece. The CPU 11 generates the title data T and the title END code TE and writes them after the interjacent data S. When the player then enters pitch and note duration data of the melody of the first music piece by using keys at the keyboard 2, the music piece data is stored following the title END code TE in the RAM 15.

After the music piece data D is entered, the player depresses the SAVE key 4b1. The CPU 11 supplies the first interjacent data to the MT interface 16. At the same time, the first music piece data stored in the RAM 15 is read out and recorded on the magnetic tape 17a through the CPU 11 and the MT interface 16.

Data entry and storage of the music pieces following the first music piece are performed in the same manner as for the first music piece. In this manner, at least 20 music pieces are recorded on the magnetic tape 17a.

One auto play mode will be described with reference to FIG. 21 wherein only one of the musical pieces stored in the magnetic tape 17a is selected and is automatically played. In this case, the player depresses the title input key 4b3 once and inputs the title name using the keys 31. A write control signal W of the read/write control signal R/W is applied to the memory 19a. The title name data is then supplied to the write buffer 32 (steps S1 and S2 of the flow chart in FIG. 21). The title data is also supplied to the display unit 8 through the driver 21, so that the title is displayed at the display unit 8. When the player depresses the LOAD key 4b2, the CPU 11 determines in step S3 whether or not the magnetic tape 17a is set at the end data position. If YES in step S3, step S4 is executed wherein the magnetic tape 17a is rewound to the start position, and the first title data is read out and is supplied to the read buffer 33 (step S6).

However, if NO in step S3, the magnetic tape 17a travels on until the next interjacent portion is detected (step S5). The title data of the corresponding music piece is then read out and is supplied to the read buffer 33. It is checked in step S7 whether or not the title data in the buffers 32 and 33 coincide. If NO in step S7, the routine returns to step S3 and the operation for the next music piece is started. However, if YES in step S7, the corresponding music data is read out and loaded in the RAM 15 (step S8), and then automatic play of the music piece is started (step S9). More particularly, the music data are read out from the RAM 15 and are sequentially supplied to the tone generator 12. As a result, the corresponding sounds are produced.

Another auto play mode will be described with reference to FIG. 22 wherein 20 music pieces are consecutively and automatically played. The title input key 4b3 is depressed, and a pair of order data and title data for each music piece are entered into the memory 19a using the keys 31. FIG. 20 shows the condition of data stored in the memory 19a.

When all the data are set in the memory 19a, the player depresses the LOAD key 4b2. Automatic play can be effected in accordance with the flow chart in FIG. 22. The first title data "AIR FOR THE G STRING (J.S. BACH)" is read out from the memory 19a and is supplied to the write buffer 32 (step S1). It is then checked in step S2 whether or not the magnetic tape 17a has reached its end position. If YES in step S2, the magnetic tape 17a is rewound to the start position, and the first title data is read out and supplied to the buffer 33 (steps S3 and S4). However, if NO in step S2, the magnetic tape 17a travels on to the next interjacent position, and the title data is read, out and supplied to the read buffer 33 (steps S5 and S6).

It is then checked in step S7 whether or not the title data in the buffers 32 and 33 coincide with each other. If NO in step S7, the routine returns to step S2 to detect the next piece. However, if YES in step S7, the music data is loaded in the RAM 15 to automatically start this music piece (steps S8 and S9). When this music piece is finished, it is checked in step S10 whether or not the next title data is written in the memory 19a. In this case, the first music piece is finished, so that the second title data "CAMPTOWN RACES (FOSTER)" is read out and supplied to the write buffer 32 in step S11. The routine then returns to step S2, and automatic play of the second music piece is effected. The above operation is repeated for 20 music pieces. This routine is then ended when the 20th music piece is detected by step S10.

In the above embodiment, data of the 20 music pieces are stored in the memory 19a. However, the number of music pieces is not limited to this number, but may be altered to any number.

In the embodiment shown in FIG. 17, a desired music piece or pieces is or are played at the loudspeaker 14 in accordance with the music data loaded from the magnetic tape 17a to the RAM 15, when the desired title data read out from the memory 19a and stored in the write buffer 32 coincides with the title data read out from the magnetic tape 17a and transferred to the read buffer 33.

Figure 23:
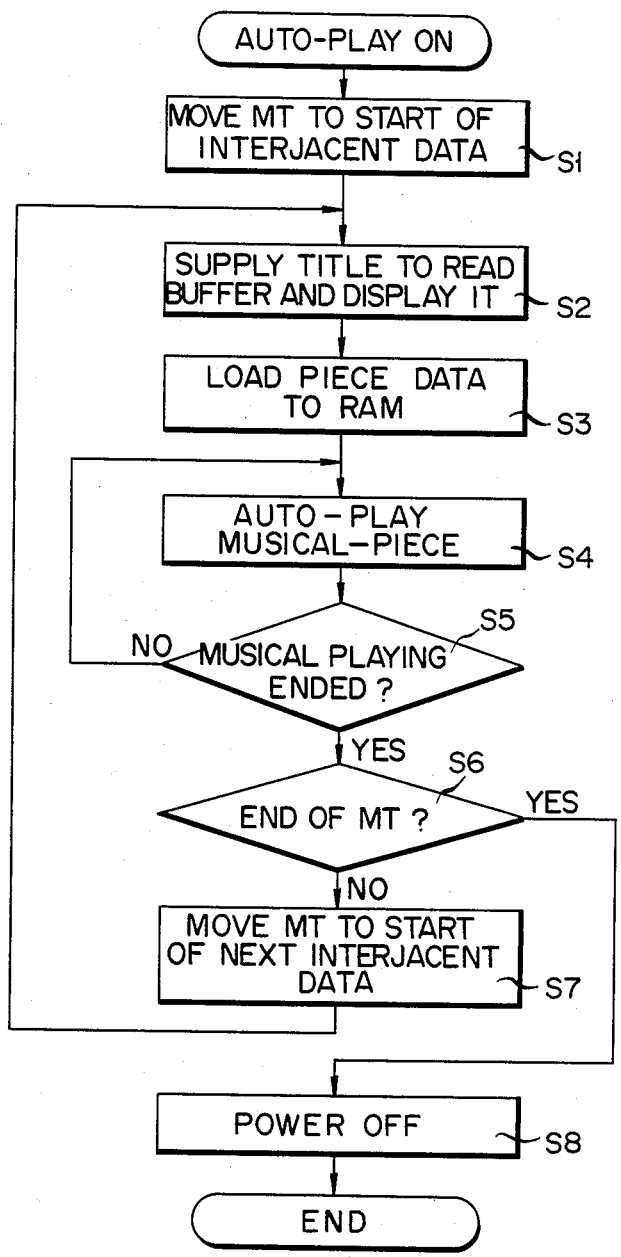

However, the apparatus shown in FIG. 17 can be applied to a case wherein all the music pieces recorded on the magnetic tape 17a are consecutively played. This musical performance will be described with reference to the flow chart in FIG. 23.

The player loads a magnetic tape 17a recorded in the manner shown in FIG. 18 in a tape recorder 17. He then sets the mode switch 7a in the PLAY position and depresses the AUTO PLAY key 4b4. The magnetic tape 17a travels until the next interjacent portion thereof is detected (step S1). The corresponding title data is read out and supplied to the read buffer 33. The title data supplied to the read buffer 33 is displayed at the display unit 8 through a driver 21 (step S2). The music data corresponding to this title data is read out and loaded in the RAM 15, and the first music piece is automatically played (steps S3 and S4). This musical playing continues until the first music piece is finished (step S5). When the performance is finished, it is checked in step S6 whether or not the magnetic tape 17a has reached its end position. If YES in step S6, power is turned off (step S8). However, if NO in step S6, the magnetic tape 17a travels on until the next interjacent portion is detected (step S7), and the routine returns to step S2. The next title data is read out and supplied to the buffer 33, and the corresponding music piece is automatically played. The above operation is repeated until the magnetic tape 17a reaches its end position. The end position of the magnetic tape 17a is detected in step S6, and the power is turned off in step S8. Continuous automatic play is then ended.

In the above embodiment, at the initial period of automatic play, it is checked whether or not the magnetic tape is at its start position. If NO, the magnetic tape travels to its end point and is rewound. However, the program of the CPU 11 may be such that the tape is rewound from a middle portion to the start point.

In the above embodiment, the next music piece data is transferred after the music piece data transferred from the magnetic tape to the RAM is automatically played and finished. However, a plurality of RAMs may be arranged such that the next music piece data is searched and loaded in an empty RAM while the immediately previous music piece is being played. In this case, data search time and data load time can be eliminated, thereby smoothly providing continuous automatic playing.

As is apparent from the above description, the present invention provides an electronic musical instrument with a tape recorder, the instrument being provided with a continuous automatic playing means wherein data of a first music piece is transferred from the tape recorder to the memory to effect automatic play, and, after automatic play is finished, the next music data transferred to the memory may be subjected to further automatic play as desired. Therefore, loading and play need not be repeated every time the music piece is played, and enjoyment of continuous automatic play of music pieces is facilitated.

What is claimed is:

1. An automatic music playing apparatus comprising:
a musical data input device including a plurality of keys for inputting musical data;
a digital memory coupled to said musical data input device for storing musical data inputted by said musical data input device, the musical data corresponding to at least one musical piece;
a tone generator coupled to said digital memory for generating a tone signal corresponding to musical data stored in said digital memory;
a magnetic recording/reproducing device coupled to said digital memory for recording musical data stored in said digital memory into a magnetic recording medium including a plurality of data areas each of which is provided for storing musical data of one musical piece, and for reproducing musical data recorded on said magnetic recording medium;
a mode selector for selectively designating at least a first operating mode and a second operating mode, said first operating mode being designated when musical data inputted by said data input device is stored in said digital memory and said second operating mode being designated when a musical data is transferred between said digital memory and said magnetic recording/reproducing device; and
a control device coupled between said musical data input device and said digital memory, between said digital memory and said tone generator, between said digital memory and said magnetic recording/reproducing device, and to said mode selector, and including means for controlling the transfer of musical data inputted by said musical data input device to said digital memory so as to store the musical data therein, when said first operating mode is selected by said mode selector; means for controlling the transfer of musical data stored in said digital memory to said magnetic recording medium to store said musical data into said magnetic recording medium, when said second operating mode is selected by said mode selector in response to an operation of a save key; means for controlling the transfer of musical data which was recorded in said magnetic recording medium in response to an operation of a load key, the musical data transferred from said magnetic recording medium being stored in said digital memory; means for causing, when said first operating mode is selected by said mode selector, a plurality of keys in said musical data input device to function as keys for inputting musical data; and means for causing, when said second operating mode is selected, at least some keys in said plurality of keys to function as keys for selectively designating one of a plurality of data areas of said magnetic recording medium for storing musical data; and
said control device further including means for controlling said magnetic recording/reproducing device such that a recording and reproduction operation of said musical data with respect to a designated data area of said magnetic recording medium is performed.

2. An automatic music playing apparatus according to claim 1, wherein:
said control device includes a memory for storing, when said second operating mode is selected, a plurality of area designating data in an order of a plurality of key operations;
whereby data areas of said magnetic recording medium are designated successively in the order of memory storing operations, and musical data of the designated data areas is reproduced by said magnetic recording/reproducing device as corresponding musical pieces in the designated order, and the reproduced musical data is stored in said digital memory in the designated order.

3. An automatic music playing apparatus according to claim 1, wherein:
said control device includes means for supplying, to a display unit, data indicating a location of a data area designated by keys of a plurality of data areas of the magnetic recording medium, the display unit displaying the location of the designated data area.

* * * * *